Figure 1:
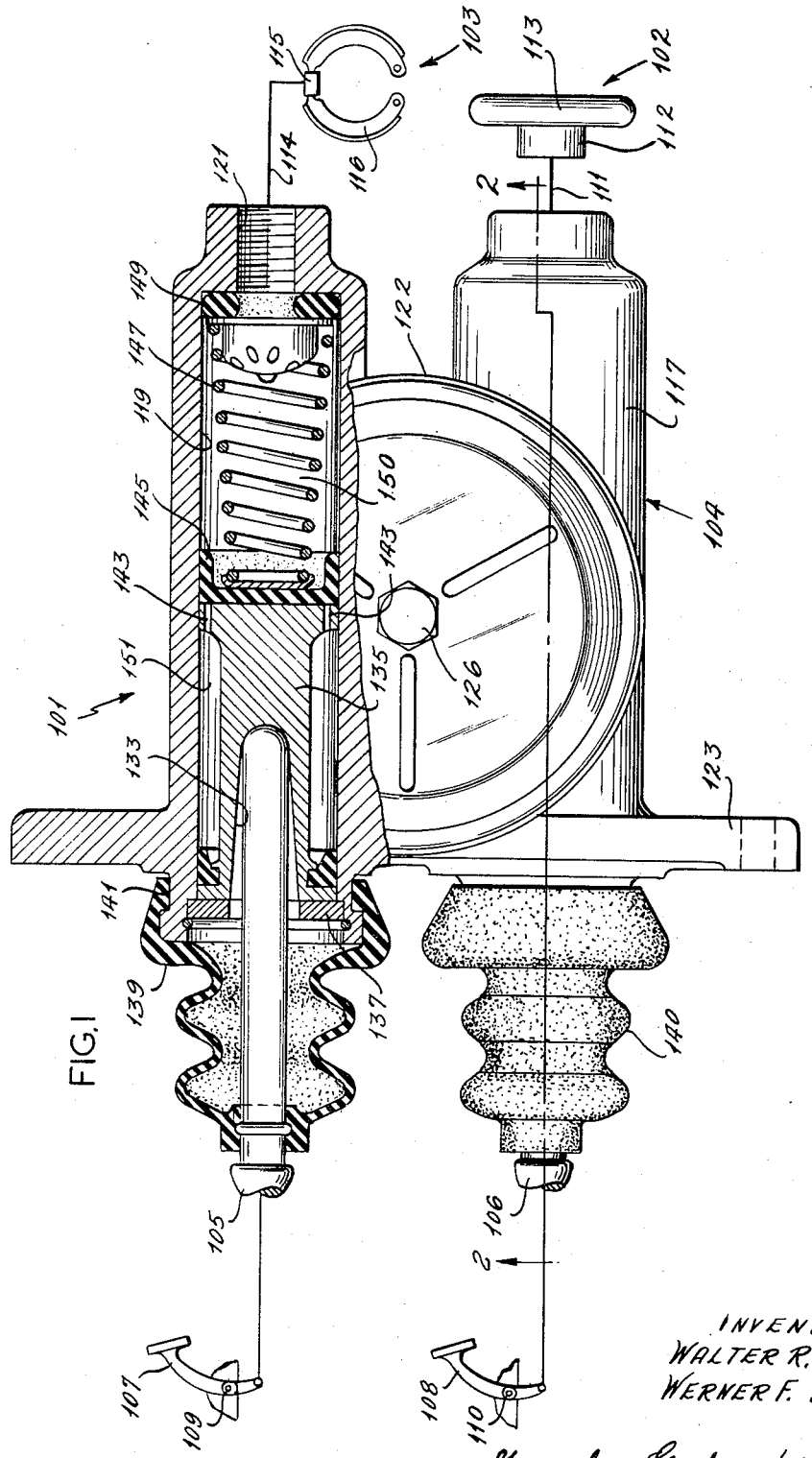

INVENTORS:
WALTER R. FREEMAN
WERNER F. BOLDT

By Gravely, Lieder & Woodruff
ATTORNEYS.

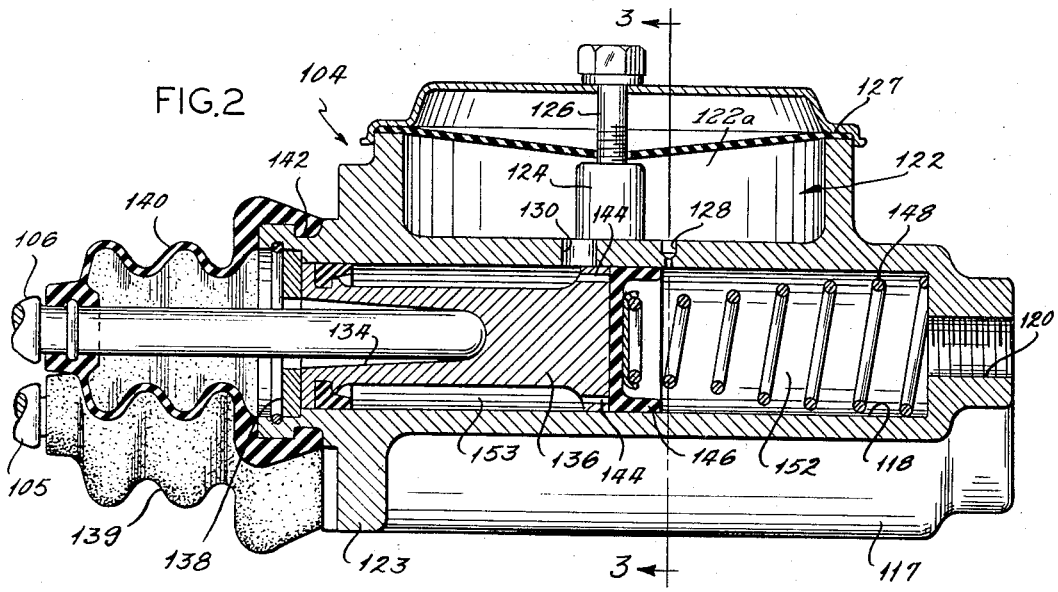
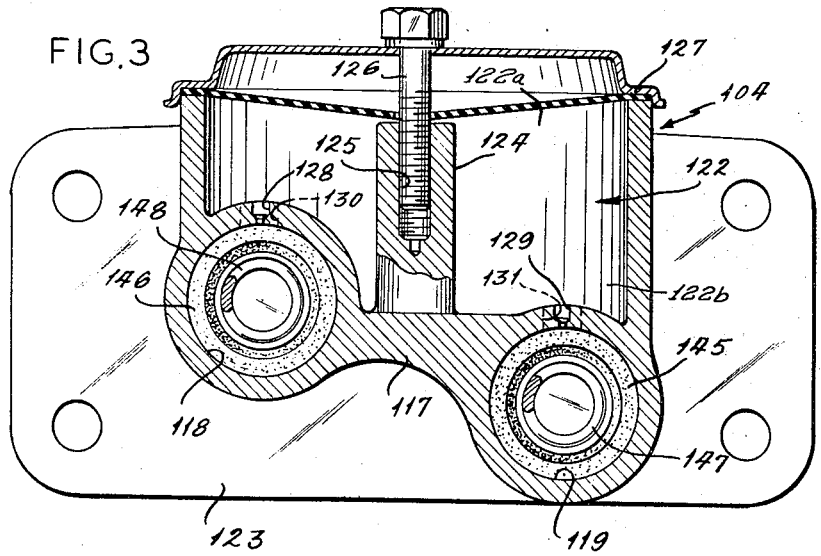

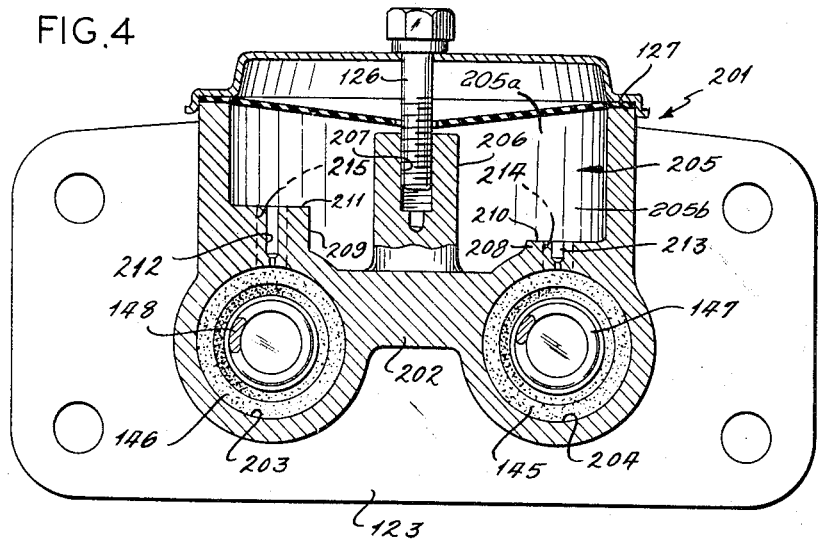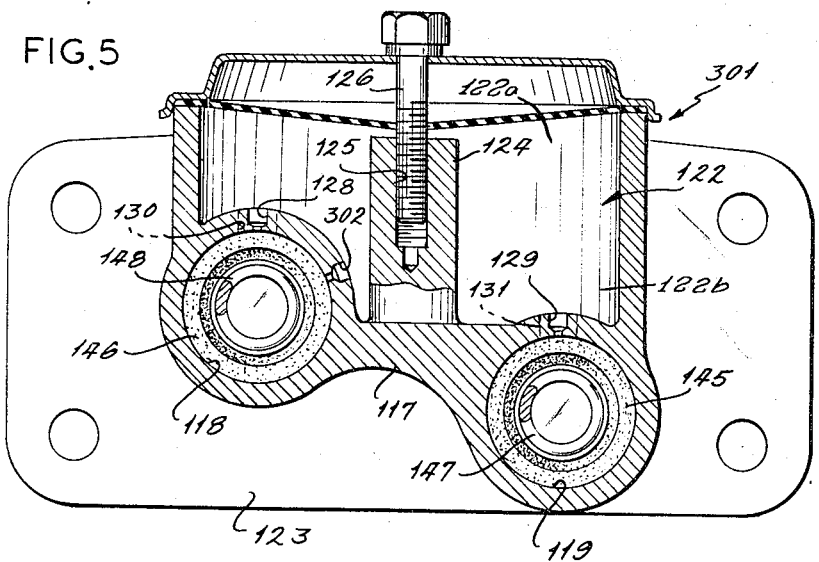

United States Patent Office 3,348,377
Patented Oct. 24, 1967

3,348,377
PRESSURE GENERATING MEANS
Walter R. Freeman, Portage Des Sioux, and Werner F. Boldt, Kirkwood, Mo., assignors to Wagner Electric Corporation, St. Louis, Mo., a corporation of Delaware
Filed Dec. 4, 1958, Ser. No. 778,145
7 Claims. (Cl. 60—54.6)

This invention relates to pressure generating means and in particular to those having dual pressure chambers with a common reservoir.

In the past, pressure generating means were provided with a pressure fluid reservoir connected by passage means to separate pressure chambers therein. The fluid pressure generated in the pressure chambers was employed to actuate servo motors, or sets of servo motors, in separate pressure fluid systems. When the pressure fluid in the reservoir common to the pressure chambers was reduced to a predetermined level or elevation, or below said predetermined level, due to leakage in the systems and/or evaporation, the effectiveness of the pressure generating means was impaired to the point where the fluid pressure systems failed simultaneously.

An object of the present invention is to provide pressure generating means having a reservoir for pressure fluid connected to separate pressure chambers by stepped passage means.

Another object of the present invention is to provide pressure generating means having a pressure fluid reservoir common to separate pressure chambers whereby one of said chambers is afforded pressure fluid priority upon a predetermined reduction of pressure fluid in said reservoir.

Still another object of the present invention is to provide pressure generating means having a reservoir common to separate pressure chambers which affords the operator a warning when the pressure fluid in said reservoir is reduced to a predetermined level.

Still another object of the present invention is to provide pressure generating means having a reservoir which is common to separate pressure chambers and also having bleeding means to insure one of said chambers pressure fluid priority over another of said chambers when the pressure fluid in said reservoir is reduced below a predetermined level or elevation.

These and other objects and advantages will become apparent hereinafter.

Briefly, the invention is embodied in pressure generating means having a reservoir for pressure fluid common to separate pressure chambers whereby a predetermined reduction of pressure fluid in said reservoir obviates pressure fluid communication with one of said chambers while maintaining said communication with another of said chambers. Modified pressure generating means is also additionally provided with bleeding means to insure one pressure chamber pressure fluid priority over another pressure chamber when the pressure fluid in the reservoir common to both of said chambers is reduced below a predetermined level or elevation.

The invention also consists in the parts and arrangement and combination of parts hereinafter described and claimed. In the accompanying drawings which form a part of the specification and wherein like numerals refer to like parts wherever they occur:

FIG. 1 is a top plan view of a fluid pressure system showing pressure generating means therein partially in cross-section, FIG. 2 is a sectional view taken along line 2—2 of FIG. 1, FIG. 3 is a sectional view taken along line 3—3 of FIG. 2, FIG. 4 is a sectional view of a modified pressure generating means showing the pressure chambers thereof at the same elevation, and FIG. 5 is a sectional view of modified pressure generating means showing bleeding means associated with one pressure chamber and showing the pressure chambers at different elevations.

Referring now to FIGS. 1, 2 and 3 in detail, a fluid pressure system 101 is provided with a clutch operating branch 102 and a brake operating branch 103. The branches 102 and 103 are independently controlled by pressure generating means, such as a dual bore master cylinder 104, which is operatively connected by linkage or push rods 105 and 106 to independent actuating means such as pedal members 107 and 108, said pedal members being pivotally mounted at 109 and 110, respectively. The clutch operating branch 102 includes a conduit 111 interposed between one outlet port of the master cylinder 104 and a fluid pressure operated component such as servo motor 112 which is adapted to actuate a clutch mechanism 113, or the like. The brake operating branch 103 includes a conduit 114 interposed between the other outlet port of said master cylinder and another component such as servo motor 115 which is adapted to actuate a wheel brake assembly 116, or the like. The branches 102 and 103 have been defined as clutch operating and brake operating only by way of illustration to simplify the following description and it is apparent that other fluid pressure operated means could readily function in said branches.

Master cylinder 104 is provided with a housing 117 with bores 118 and 119 therein, said bores 118 and 119 being at different elevations or levels. Outlet ports 120 and 121 which receive conduits 111 and 114, as previously mentioned, are provided through the end wall of bores 118 and 119, respectively. The master cylinder housing 117 is also provided with an integrally formed pressure fluid reservoir 122 having an upper main chamber portion 122a and a sump chamber portion 122b. An integrally formed mounting flange 123 of the dual master cylinder 104 is adapted for fixed connection with a vehicle fire wall or the like (not shown). The reservoir 122 is provided with an integral, centrally located post 124 having a threaded bore 125 therein to cooperatively receive a stud 126 which retains a seal and closure member assembly 127 in sealable engagement with the upper extremity of said reservoir.

Inlet portholes 128 and 129 have one end intersecting the wall of the bores 118 and 119, respectively, near the mid-portion thereof while the other end of said inlet portholes 128 and 129 connect with the main chamber portion 122a and the sump chamber portion 122b, respectively, of the reservoir 122. Compensating ports 130 and 131 are spaced leftwardly of the inlet portholes 128 and 129, respectively, and also have one end intersecting the wall of the bores 118 and 119 while the other ends of the compensating ports 130 and 131 are in fluid communication with the main chamber portion 122a and the sump chamber 122b, respectively, of the reservoir 122. It will be noted that the upper ends or upper extremities of the inlet porthole 128 and the compensating port 130 are in a plane which is elevated above the upper ends or upper extremities of the inlet porthole 129 and the compensating port 131.

Push rods 105 and 106 have one end pivotally received in recesses 133 and 134 provided in the leftward end of secondary seal carrying master cylinder pistons 135 and 136, respectively, which are slidable in the bores 119 and 118 of the housing 117; and the other end of push rods 105 and 106 are pivotally received by the pedal members 107 and 108, respectively, as previously mentioned. The pistons 135 and 136 are retained against displacement from the leftward end of bores 119 and 118 by stop plate and snap ring assemblies 137 and 138, respectively, and resilient boots 139 and 140 have one end carried by push rods 105 and 106, respectively, while the other ends thereof are received in suitable grooves 141 and 142 in the housing 117 to prevent the entry of foreign particles into said bores. The pistons 135 and 136 are provided with a plurality of ports 143 and 144, respectively, through the rightward end thereof for pressure fluid compensation purposes, said ports being normally closed by primary sealing cups 145 and 146. The cups 145 and 146 are slidably received in bores 119 and 118, respectively, and are normally biased into abutment with the rightward end of the pistons 135 and 136 by springs 147 and 148. The spring 147 is interposed between the cup 145 and a residual pressure check valve and seal assembly 149 which controls the outlet port 121 and which is normally biased into sealable engagement with the end wall of the bore 119 about said outlet port. The spring 148 is interposed between the cup 146 and the end wall of the bore 118. Since the clutch mechanism 113 does not require a residual pressure to function, a residual pressure check valve and seal assembly is not shown in the bore 118.

The cup 145 divides the bore 119 into expansible high and low pressure chambers 150 and 151, and the cup 146 divides the bore 118 into similar high and low pressure chambers 152 and 153. Normally the cup 146 is positioned in the bore 118 between the inlet porthole 128 and compensating port 130 to permit pressure fluid communication between the reservoir 122 and high and low pressure chambers 152 and 153, and the cup 145 is similarly positioned in the bore 119 between the inlet porthole 129 and compensating port 131 to permit pressure fluid communication between the reservoir and the high and low pressure chambers 150 and 151.

Under normal operating conditions, the clutch operating branch 102 and brake operating branch 103 may be actuated simultaneously or individually at the discretion of the operator. When operator or manual forces are applied to pedal members 107 and 108, said forces are transmitted through push rods 105 and 106, respectively, to move pistons 135 and 136 and cups 145 and 146 rightwardly in bores 119 and 118 against the compressive forces of springs 147 and 148. During the initial movement, the cup 146 passes over the inlet porthole 128, and the cup 145 passes over the inlet porthole 129 thereby interrupting pressure fluid communication between the reservoir 122 and high pressure chambers 150 and 152. Further movement of the cup 145 displaces pressure fluid from the high pressure chamber 150 through the residual check valve assembly 149, the outlet port 121 and the conduit 114 to the servo motor 115 to establish a fluid pressure and energize the wheel brake assembly 116 to effect braking. Further movement of the cup 146 displaces pressure fluid from the high pressure chamber 152 through the outlet port 120 and conduit 111 to the servomotor 112 to establish a fluid pressure and energize the clutch mechanism 113.

When the manual forces are released from the pedal members 107 and 108, the component parts of the master cylinder 104 are returned to their original position by the compressive forces of the springs 147 and 148, and the established fluid pressure in the branches 112 and 113. Of course, as the manual forces are released, a partial vacuum is momentarily created in the high pressure chambers 150 and 152 and pressure fluid compensation occurs in the usual manner, that is, pressure fluid will flow from the reservoir 122 through compensating ports 130 and 131 into the low pressure chambers 153 and 151 and therefrom through the ports 144 and 143 in the pistons 136 and 135 and past the sealing lips of cups 146 and 145, which are in a collapsed condition due to the abovementioned partial vacuum, into the high pressure chambers 152 and 150. In addition, some pressure fluid compensation will also occur in the bores 118 and 119 through the inlet portholes 128 and 129.

Under the above described operating conditions, if a leak occurs in either, or both, of the branches 102 and 103, the manual applied forces on the pedal members 107 and 108 displaces pressure fluid from the bores 118 and 119, as previously described, and some of this pressure fluid is lost due to the above assumed leak. Eventually, loss of pressure fluid in this manner reduces the volume of the pressure fluid in the reservoir 122 to a level or elevation which is substantially coextensive with the upper end or extremity of the inlet porthole 128 but which is at a level or elevation above the upper end or extremity of the inlet porthole 129. In other words, pressure fluid is reduced below the level of the main chamber portion 122a so that residual pressure fluid is positioned in the sump chamber 122b. With the pressure fluid in the reservoir 122 at this reduced level, the bore 118 cannot be replenished with pressure fluid from the reservoir 122 for compensation purposes, but the bore 119 is afforded ample pressure fluid for compensation purposes and fluid pressure generation in the brake operating branch 103 upon actuation thereof, as previously described. If the above assumed leak is in the branch 102, subsequent actuation of the pedal member 108 by the operator further reduces the level of pressure fluid in the bore 118 resulting in a spongy feel or low pedal since the volume of pressure fluid displaced by the piston 136 and cup 146 is not great enough to establish a fluid pressure to actuate the servo motor 112 and energize the clutch mechanism 113. If the above assumed leak is in the branch 103, actuation of the pedal member 107 by the operator reduces the pressure fluid in the reservoir 122 to a level which is substantially coextensive with or slightly below the upper extremity of the inlet porthole 128 and compensation port 130. At this time, the volume of pressure fluid in the bore 118 is sufficient to satisfactorily actuate the clutch servomotor 112; however, subsequent actuation of the piston 136 and cup 146 will displace pressure fluid through the inlet porthole 128 and compensating port 130 into the reservoir 122. Accordingly, fluid is pumped from the bore 118 on each fluid displacement movement of the piston assembly 136 so that the level of pressure fluid in the bore 118 is reduced affording the operator a spongy feel or low pedal upon subsequent applications of pedal member 108, as previously described. The spongy feel or low pedal felt by the operator is a warning not only that there is a leak in the system 101 but also that the pressure fluid in the reservoir 122 is dangerously low. Since the level of pressure fluid in the sump chamber 122b of the reservoir 122 is maintained at an elevation above the upper extremity of the inlet porthole 129 and compensating port 131, the operator still has an adequate volume of pressure fluid in said reservoir for compensation purposes and in the brake operating branch 103 to effect the braking, as previously described.

From the above, it is apparent that pressure generating means 104 is provided with separate pressure chambers 150 and 153 which are connected to a common reservoir 122 by inlet portholes 128 and 129, respectively. The upper end or extremity of the porthole 128 lies in a plane which is elevated above that in which the upper end or extremity of the inlet porthole 129 lies. In other words, the upper extremities of the portholes 128 and 129 are stepped so as to be in different levels in the reservoir 122.

It is apparent pressure generating means 104 is provided with the pressure fluid reservoir 122 common to bores 118 and 119 whereby one of said bores is afforded pressure fluid priority over the other. If a leak occurs in either of the hydraulic systems or branches 102 or 103 to reduce the pressure fluid in the reservoir 122 to a level which is substantially coextensive or slightly below the upper extremity of the inlet porthole 128 and compensating port 130, pressure fluid compensation between the bore 118 and the reservoir 122 is obviated. Since the pressure fluid in the reservoir 122 is maintained at a level which is substantially coextensive with the upper extremity of the inlet porthole 128 and compensating port 130, this level is well above the upper extremity of the inlet porthole 128 and compensating port 130 thereby maintaining a volume of pressure fluid in the reservoir 122 which is adequate to supply the brake actuating branch 103. In this manner, the pressure chamber 150 in the branch 103 is afforded pressure fluid priority over the pressure chamber 152 in the branch 102.

It is also apparent that pressure generating means 104 affords the operator a warning when the pressure fluid in the reservoir 122 is reduced to a predetermined level. If a leak occurs in the system 101 to reduce the pressure fluid in the reservoir 122 to a level which is substantially coextensive or slightly below the upper extremity of the inlet porthole 128 and compensating port 130, pressure fluid communication between the bore 118 and said reservoir is obviated. Subsequent actuation of the piston 136 and cup 146 will displace pressure fluid from the bore 118 either through the inlet porthole 128 and compensating port 130, if the above assumed leak is in the branch 103, or through the leak itself, if the above assumed leak is in the branch 102. In either event, the reduction of the level of pressure fluid in the bore 118 affords the operator either a low pedal or a spongy feel which is indicative of the extent of actuation of the clutch mechanism 113, and this low pedal or spongy feel serves to warn the operator that the pressure fluid in the reservoir 122 is at a dangerously low level.

Referring now to FIG. 4, pressure generating means or master cylinder 201 is shown therein having substantially the same component parts and is connected in the system 101 in the same manner as the previously described pressure generating means 104 with the following exceptions.

The master cylinder 201 is provided with a housing 202 having spaced bores 203 and 204 therein which are on the same elevation and which are connected in the system 101 in the same manner as the previously described bores 118 and 119. The housing 202 is also provided with a reservoir 205 having an upper main chamber portion 205a and a sump chamber portion 205b. An integral, centrally located post 206 in the reservoir 205 is provided with a threaded bore 207 for cooperatively receiving the stud 126 which retains the seal and closure assembly 127 in sealable engagement with the upper extremity of said reservoir.

Bosses 208 and 209 are also integrally provided in the main chamber 205a and sump chamber 205b, respectively, of the reservoir 205, the bosses 208 and 209 having upper surfaces 210 and 211, respectively, and the upper surface 211 of the boss 209 is stepped or elevated relative to the upper surface 210 of the boss 208. In other words, the upper surface 211 of the boss 209 lies in a plane which is above that in which the upper surface 210 of the boss 208 lies. The boss 209 is positioned in the reservoir 205 so that an inlet porthole 212 has one end intersecting the bore 203 near the mid-portion thereof while the other end intersects the upper surface 211 of the boss 209 and is in fluid communication with the main chamber 205a. The boss 208 is similarly positioned in the reservoir 205 so that the inlet porthole 213 has one end intersecting the bore 204 near the mid-portion thereof while the other end intersects the upper surface 210 of said boss. Compensation ports 214 and 215 are also provided through bosses 208 and 209, respectively, to connect the sump chamber 205b and main chamber 205a of the reservoir 205 with the bores 203 and 204, and the compensation ports 214 and 215 are spaced rearwardly from the inlet portholes 213 and 212, respectively.

The master cylinder 201 functions in the same manner as the master clinder 104 previously decsribed in the system 101, and the stepped surfaces 210 and 211 of the bosses 208 and 209 obviate the necessity of providing vertically spaced or elevated bores.

Referring now to FIG. 5, pressure generating means or master cylinder 301 is shown having the same housing and component parts and functioning the same as the master cylinder 104 previously described in the system 101 with the following exceptions.

Bleeding means or port 302 is provided in the housing 117 having one end intersecting the wall of the bore 118 adjacent the mid-portion thereof while the other end connects with the sump chamber 122b of the reservoir 122. The upper extremity of the bleeding port 302 is elevated above the upper extremity of the inlet porthole 129 and below the upper extremity of the inlet porthole 128. In other words, the upper extremity of the bleeding port 302 is interposed between the spaced upper extremities of the inlet porthole 128 and 129 and is also below the upper wall portion of the bore 118, as shown in FIG. 5. The master cylinder 301 is actuated in the same manner as previously described, and the cup 146 passes over the inlet porthole 128 and the bleeding port 302 simultaneously during the fluid pressure generating stroke thereof.

Under the previously described operating conditions if a leak occurs in the clutch operating branch 102, the manual force applied on the pedal member 107 displaces pressure fluid from the bore 119, and some of this displaced pressure fluid is lost from said branch due to the above assumed leak. Eventually, loss of pressure fluid in this manner reduces the pressure fluid in the reservoir 122 to a level which is below the upper extremity of the inlet porthole 128 but which is above the upper extremity of the inlet porthole 129 and also above the bleeding port 302, and said bleeding port maintains an equal pressure fluid level in the bore 118 and said reservoir. When the pressure fluid in the reservoir 122 and bore 118 is diminished to a level which is substantially coextensive with or slightly below the bleeding port 302, subsequent actuation of the pedal 108 by the operator results in a spongy feel or low pedal since the volume of pressure fluid displaced by the piston 136 and cup 146 is not great enough to establish a fluid pressure to actuate the servo motor 112 and energize the clutch mechanism 113. The spongy feel or low pedal felt by the operator is a warning not only that there is a leak in the system 101 but also that the pressure fluid is dangerously low in the reservoir 122; however, the operator still has an adequate volume of pressure fluid in said reservoir for compensation purposes in the brake operating branch 103 and to effect braking, as previously described.

Under the previously described operating conditions, if a relatively slow leak is developed only in the brake operating branch 103, the pressure fluid is reduced to a level which is substantially coextensive with or slightly below the upper end of the inlet porthole 128. Ordinarily, pressure fluid could be trapped in the bore 118 and clutch operating branch 102 so that said branch would function satisfactorily for a few applications of pedal member 108 while the pressure fluid in the reservoir 122 and the brake operating branch 103 could be depleted to a level whereby subsequent actuation of the piston 135 and cup 145 would not displace enough pressure fluid to establish a fluid pressure to actuate the servo motor 115 and energize the wheel brake assembly 116. However, the bleeding port 302 obviates this possibility by maintaining at least the same level of pressure fluid in the bore 118 as in the reservoir 122 and providing a more positive pumping action or fluid displacement from the bore 118. In this manner, when the pressure fluid is reduced in the bore 118 and reservoir 122 to a level which is substantially coextensive with or slightly below the bleeding port 302 due to the above assumed leak in the brake operating branch 103, actuation of the pedal 107 again results in a spongy feel or low pedal since the volume of pressure fluid displaced by the piston 136 and cup 146 is not great enough to energize the servo motor 112. As a result, this spongy feel or low pedal felt by the operator while energizing the clutch operating branch 102 serves as a warning that the system 101 is leaking and that the pressure fluid in the reservoir 122 is dangerously low. At the same time that the operator is thus warned, a sufficient volume of pressure fluid is maintained in the reservoir 122 to energize the brake operating branch 103 to effect braking albeit leaking.

From the above, it is apparent that pressure generating means 301 is provided with a reservoir 122, which is common to separate pressure chambers 150 and 152, and also bleeding means 302 to insure one of said chambers pressure fluid priority over the other of said chambers when the pressure fluid in said reservoir is reduced below a predetermined level. When a leak is developed in the system 101 either in the branches 102 or 103 thereof, the bleeding port 302 serves to deplete the pressure fluid from the bore 118 at the same rate as it is depleted from the reservoir 122 until the level of said pressure fluid is substantially coextensive or slightly below the level of said bleeding port. Subsequent energization of the clutch operating branch 102 results in a spongy feel or low pedal which serves as a warning to the operator that there is a leak in the system 101 and that the pressure fluid in the reservoir 122 is dangerously low. In this manner, whether the assumed leak is in the clutch or brake operating branches 102 and 103, the pressure fluid is always bled from the bore 118 in the clutch operating branch 102 by the bleeding port 302 thereby insuring the bore 119 in the brake operating branch 103 pressure fluid priority.

It is now apparent that there has been provided pressure generating means which fulfills all of the objects and advantages sought therefor.

The foregoing description and accompanying drawings have been presented only by way of illustration and example, and changes, alternations in the instant disclosure which will be apparent to one skilled in the art, are contemplated as within the scope of the present invention which is limited only by the claims which follow.

What we claim is:

1. A pressure generating system comprising a first pressure fluid branch having a first cylinder and piston assembly for actuating a preferred pressure fluid responsive device, a second fluid pressure branch having a second cylinder and piston assembly adapted to be operated independently of said first cylinder and piston assembly for actuating a sacrificial fluid pressure device, said first and second cylinder having first and second compensation ports, respectively, a pressure fluid reservoir in communication with both said first and second cylinders through the compensation ports therefor, said second compensation port having an upper fluid inlet end positioned in said reservoir at a predetermined level spaced above the upper fluid inlet end of said first fluid compensation port, and a bleeder port having a fluid inlet end connecting said second cylinder with said reservoir at a level intermediate to the upper fluid inlet end of said first and second compensation ports.

2. A fluid pressure generating system for a motor vehicle comprising a first fluid pressure branch for operating a preferred servo motor and a second fluid pressure branch for operating a sacrificial servo motor, a reservoir for pressure fluid having a main fluid supply chamber and a sump chamber, a first cylinder and piston assembly in said first branch in fluid communication with said sump chamber to receive pressure fluid therefrom, a second cylinder and piston assembly in said second branch in fluid communication with said main chamber of said reservoir, and means forming pressure fluid passage means between said second cylinder and said sump chamber to supply fluid from said second cylinder to said sump chamber and effect reduction of pressure fluid in said second cylinder and main chamber to maintain thereby pressure fluid supply to said first branch at the expense of depletion of pressure fluid from said second branch to warn thereby the operator of the vehicle of pressure fluid loss from the fluid pressure generating system.

3. Pressure generating means for a vehicle comprising a housing, a reservoir for pressure fluid in said housing including a main chamber and a sump chamber disposed below said main chamber in gravity drain relation therewith, a pair of bores for receiving a supply of pressure fluid from said main chamber and said sump chamber, respectively, separate passage means connecting one of said bores in pressure fluid communication with said main chamber and connecting the other of said bores in pressure fluid communication with said sump chamber, piston means in each of said bores and movable to generate fluid pressure therein, one of said passage means having an upper extremity in said main chamber above that of the other of said passage means in said sump chamber and defining a predetermined low pressure fluid depletion level in said reservoir, any pressure fluid in said main chamber being drained by gravity into said sump chamber upon reduction of the pressure fluid level in said reservoir below said predetermined level to effect substantially complete depletion of the supply of pressure fluid from said main chamber to said one bore and sacrifice the fluid pressure generating potential of the piston means therein and to thereby afford a priority supply of pressure fluid to said sump chamber and other bore to insure the fluid pressure generating potential of the piston means therein.

4. A fluid pressure generating system for a vehicle comprising a housing having a reservoir for pressure fluid, first and second fluid pressure generating cylinder and piston assembly means in said housing, a first fluid pressure branch connected to said first cylinder and piston assembly means and including a preferred servo motor adapted to be energized thereby, a second fluid pressure branch connected to said second cylinder and piston assembly means and including a sacrificial servo motor adapted to be energized thereby, a main chamber and a sump chamber below said main chamber in said reservoir, said main chamber being disposed in pressure fluid gravity drain relation with said sump chamber, first passage means establishing pressure fluid communication between said first cylinder and piston assembly means and said sump chamber, second passage means establishing pressure fluid communication between said second cylinder and piston assembly means and said main chamber so long as the pressure fluid level in said reservoir is above a predetermined low depletion level, any pressure fluid in said main chamber draining into said sump chamber when the pressure fluid level in said reservoir falls below said predetermined level to maintain thereby a priority supply of pressure fluid from said sump chamber to said first cylinder and piston assembly and insure the pressure fluid generating potential thereof to energize said preferred servo motor and to effect substantially complete depletion of the pressure fluid supply from said main chamber to said second cylinder and piston assembly and sacrifice the fluid pressure generating potential thereof impairing effective energization of said sacrificial servo motor to warn thereby the operator of the vehicle of pressure fluid loss from the fluid pressure generating system.

5. A fluid pressure generating system for a vehicle comprising a first fluid pressure branch for operating a preferred servo motor and a second fluid pressure branch for operating a sacrificial servo motor, a reservoir for storing pressure fluid, a first cylinder and piston assembly in said first branch and a second cylinder and piston assembly in said second branch, said first and second cylinders being disposed below said reservoir and each having an upper wall portion defining a portion of said reservoir, a first passage connecting said first cylinder with said reservoir and a second passage in pressure fluid communication between said second cylinder and said reservoir to receive pressure fluid therefrom, said second passage having a fluid inlet end disposed in said reservoir at an elevation above the fluid inlet end of said first passage in said reservoir and said fluid inlet ends being in direct fluid communication in said reservoir, whereby the supply of pressure fluid from said reservoir to said second cylinder is interrupted upon a predetermined loss of pressure fluid from said system reducing the pressure fluid in said reservoir to a level below the fluid inlet end of said second passage to subsequently impair effective energization of said sacrificial servo motor in response to the operator applied force on said second piston assembly and warn the operator of the loss of pressure fluid from the system and whereby the residual supply of pressure fluid in said reservoir is delivered to said first cylinder by said first passage to afford said first cylinder pressure fluid priority for subsequent energization of said preferred servo motor in response to the operator applied froce on said first piston assembly.

6. A fluid pressure generating system for a vehicle comprising a first fluid pressure branch for operating a preferred servo motor and a second fluid pressure branch for operating a sacrificial servo motor, a reservoir for storing pressure fluid, a first cylinder and piston assembly in said first branch and a second cylinder and piston assembly in said second branch, a first passage connecting said first cylinder with said reservoir and a second passage in pressure fluid communication between said second cylinder and said reservoir to receive pressure fluid therefrom, said second passage having a fluid inlet end disposed in said reservoir at an elevation above the fluid inlet end of said first passage in said reservoir and said fluid inlet ends being in direct fluid communication in said reservoir, whereby the supply of pressure fluid from said reservoir to said second cylinder is interrupted upon a predetermined loss of pressure fluid from said system reducing the pressure fluid in said reservoir to a level below the fluid inlet end of said second passage to subsequently impair effective energization of said sacrificial servo motor in response to the operator applied force on said second piston assembly and warn the operator of the loss of pressure fluid from the system and whereby the residual supply of pressure fluid in said reservoir is delivered to said first cylinder by said first passage to afford said first cylinder pressure fluid priority for subsequent energization of said preferred servo motor in response to the operator applied force on said first piston assembly, said second passage being formed through a wall of said second cylinder and having its fluid inlet end in said reservoir positioned at a vertical elevation lower than the upper portion of said second cylinder to assure reduction of fluid in said second cylinder when the pressure fluid level in said reservoir drops to the fluid inlet end level of said second passage.

7. A pressure generating system for a vehicle comprising first and second branches operating first and second fluid pressure responsive components of said system, a reservoir for pressure fluid having an upper main chamber and a lower sump chamber, said upper main chamber being disposed in gravity drain relation with said lower sump chamber, a first fluid pressure generating cylinder and piston assembly in said first branch in pressure fluid communication with said lower sump chamber, a second fluid pressure generating cylinder and piston assembly in said second branch in pressure fluid communication with said upper main chamber so long as the pressure fluid level in said reservoir is above a predetermined low depletion level, any pressure fluid in said upper main chamber draining into said lower sump chamber upon reduction of the pressure fluid level in said reservoir below said predetermined level to maintain a priority supply pf pressure fluid to said first cylinder and piston assembly and insure the pressure generating potential thereof and to effect substantially complete depletion of the pressure fluid supply to said second cylinder and piston assembly and sacrifice the pressure generating potential thereof in order to warn the operator of the vehicle of pressure fluid loss from the pressure generating system.

References Cited
UNITED STATES PATENTS

| | | | |
|---|---|---|---|
| 2,018,023 | 10/1935 | Kliesrath | 60—54.6 X |
| 2,131,459 | 9/1938 | Weatherhead | 60—54.6 X |
| 2,141,358 | 12/1938 | Meeks | 60—54.6 X |
| 2,213,947 | 9/1940 | Bowen | 60—54.6 X |
| 2,266,597 | 12/1941 | Green | 60—54.5 X |

MARTIN P. SCHWADRON, *Primary Examiner.*

SAMUEL LEVINE, *Examiner.*

R. R. BUNEVICH, *Assistant Examiner.*